United States Patent [19]

Hoffman, Jr.

[11] Patent Number: 4,937,605
[45] Date of Patent: Jun. 26, 1990

[54] HOLDER FOR DISPOSABLE PHOTOGRAPHIC FILM PACKAGES

[76] Inventor: Robert H. Hoffman, Jr., 7680 Buffalo Rd., Nashville, Tenn. 37209

[21] Appl. No.: 279,079

[22] Filed: Dec. 2, 1988

[51] Int. Cl.⁵ .............................................. G03B 17/26
[52] U.S. Cl. ..................................... 354/276; 354/282
[58] Field of Search ............... 354/276, 277, 278, 279, 354/281, 282, 283, 284, 285; 250/182, 187, 188

[56] References Cited

U.S. PATENT DOCUMENTS

| | | | |
|---|---|---|---|
| 2,056,279 | 10/1936 | Kulick | 354/276 |
| 3,857,040 | 12/1974 | Zwettler et al. | 378/182 |
| 4,725,865 | 2/1988 | Hoffman | 354/276 |
| 4,821,054 | 4/1989 | Armbruster et al. | 354/282 |
| 4,821,055 | 4/1989 | Loose et al. | 354/282 |

Primary Examiner—A. A. Mathews
Attorney, Agent, or Firm—Barnes & Thornburg

[57] ABSTRACT

A photographic film holder for use with a removable photographic film package has a bottom portion positioned in a spaced relationship with respect to a top portion to form a film package receiving cavity therebetween. The top portion and the bottom portion are movable transversely relative to one another by means of a slide carrier having pins which cooperate with camming surfaces. A film position retention tab is operative when the holder is in the closed position for holding the film in an exposing anchoring position. Said holder being movable to an open position releasing the film position retention tab and opening the package insertion slot to permit withdrawal of the film package from the holder.

24 Claims, 5 Drawing Sheets

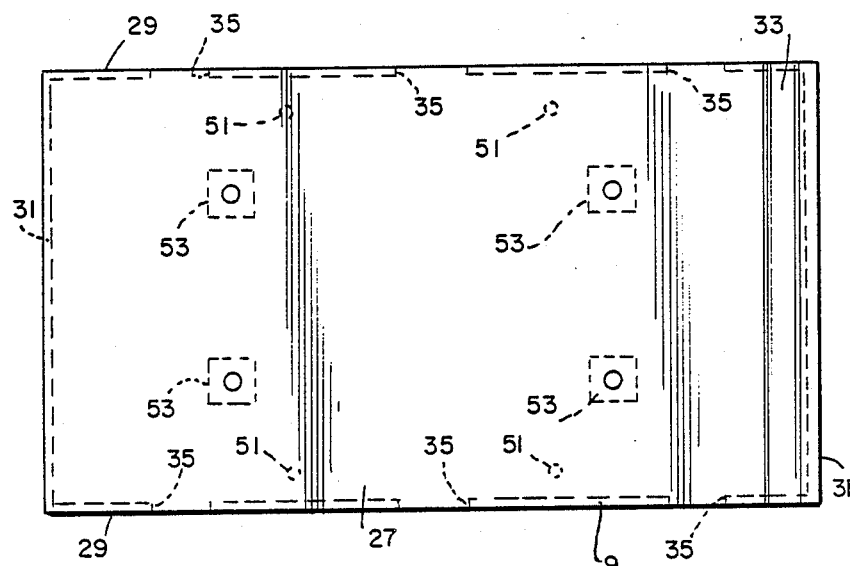
FIG. 8
FIG. 9
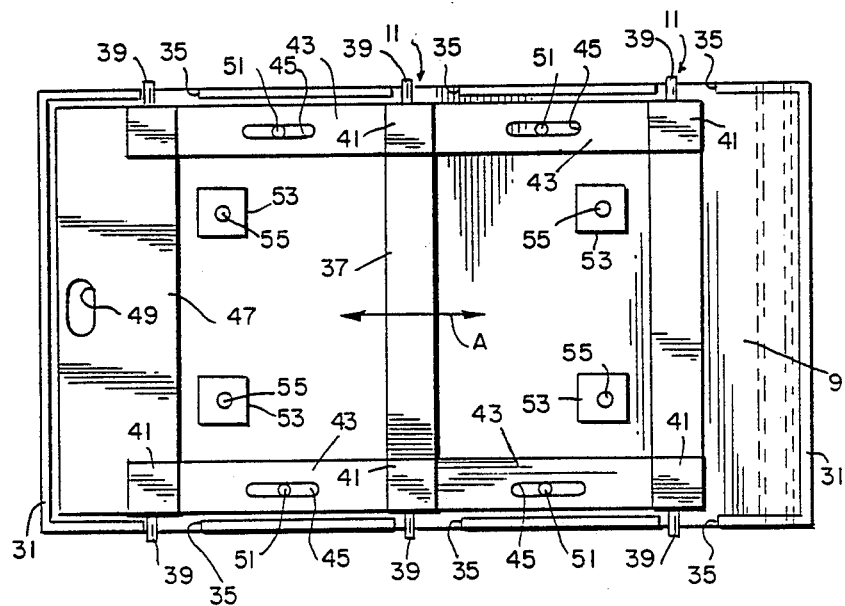
FIG. 10

HOLDER FOR DISPOSABLE PHOTOGRAPHIC FILM PACKAGES

BACKGROUND AND SUMMARY OF THE INVENTION

This invention generally relates to holders for cut photographic film, and more particularly, to a photographic film holder for use with a disposable photographic film package. The holder is provided with an arrangement for moving various components of the holder to selectively permit and prevent withdrawal of the photographic film package.

Holders for disposable film packages are known such as disclosed in my U.S. Pat. No. 4,725,865, the entire disclosure of which is herein incorporated by reference. A commercially available version of this holder was introduced by Eastman Kodak Co. in Oct. of 1988 at the Photokina Exposition in Cologne, West Germany, under the Kodak trade mark "Kodak READYLOAD Packet Film Holder". It is not known whether this Kodak READYLOAD holder constitutes prior art vis-a-vis the preferred disclosed embodiments of this present application, it being noted that the present invention was conceived and reduced to practice before Oct. of 1988. The just mentioned holders are adapted for use with disposable film packages consisting of a substantially flat film carrier to which two sheets of cut film are attached, one on each side of the carrier. The carrier is packaged in an envelope having one open end through which the carrier may be withdrawn for exposure, such as described in my above-noted U.S. Pat. No. 4,725,865. Certain of these holders can also accommodate film packages with a single sheet of film such as the packages marketed by Polaroid Corporation under the trademark Prochrome.

In use, the film packages contemplated for use with the inventive holder are to be inserted into the holder, so that the sheets of film are properly positioned in the holder for exposure in a camera. Once the film package is fully inserted into the holder, film position anchoring means are provided for anchoring the film sheets in position so that the envelope may be partly withdrawn to uncover the sheet of film to be exposed by the camera. After exposure, the envelope is returned to a light-tight sealing position in the holder. The film position anchoring means is then released and the holder's package accommodating slot is opened sufficiently so that the package, with the film once again contained in a light-tight enclosure in the envelope, may be removed for later processing. With film packages having two sheets of film according to my above-noted U.S. Pat. No. 4,725,865, the film package can be turned over and reinserted into the holder envelope insertion slot to expose the second sheet of film.

The film holder of my earlier U.S. Pat. No. 4,725,865 is formed with a bottom portion which is positioned in a spaced relationship to a top portion so as to form a film package receiving cavity defined between the top and bottom portions of the holder. These top and bottom portions are movable transversely relative to one another between a first position, wherein the top and bottom portions are relatively more distant from one another and a second position, wherein the top and bottom portions are positioned relatively closer to one another. When the top and bottom portions are in the second position the envelope insertion slot is disposed so as to prevent the withdrawal of the film package. When the top and bottom portions are in the first position, the film package may be withdrawn through the envelope insertion slot. The top and bottom portions of this photographic film holder are spring biased toward one position and are held in the other position against the holder spring force when inserted into a spring loaded camera back. This arrangement is especially advantageous in providing a simple to construct holder which accommodates in the film packages in a simple manner, utilizing the resilient clamping forces of the generally available camera back.

The above-noted Kodak READYLOAD Packet Film Holder utilizes the features of my above-noted U.S. Pat. No. 4,725,865, with the mechanism for releasing the film package utilizing a spring loaded lever which is movable axially parallel to the envelope insertion direction. This spring loaded lever serves to control the film anchoring device to hold the film in position while the envelope is moved to accommodate exposure and to control the opening of the package insertion slot by moving a bottom portion in the form of a film backing plate to thereby permit or prevent withdrawal of the film package from the film holder.

Both of these arrangements utilize spring force to bias the film holder parts toward an end position controlling withdrawal of the film package from the holder. This spring force also controls the operation of the film anchoring operation in dependance on the relative position of the spring biased parts.

An object of the present invention is to provide an improved holder which may be manufactured in an economical manner and which will provide for a simple positive control of the respective positions of the holder parts for accommodating film anchoring and exposure with partial withdrawal of the envelope and for accommodating insertion and withdrawal of the film package.

Another object of the invention is to provide an improved holder which can interchangeably accommodate the different film packages being used commercially, including the Polaroid Prochrome packages and the Eastman Kodak READYLOAD packages.

In accordance with certain preferred embodiments of the present invention, there is provided a photographic film holder of the above noted type which includes a positive control mechanism whereby the film package can be readily and reliably inserted, anchored for exposure, and reclosed and withdrawn in a light-tight condition. In especially preferred embodiments a cam guide connection is provided for positively controlling the relative movement of the holder parts defining the film anchoring structure and defining the film package insertion and withdrawal slot. Especially preferred embodiments utilize a rotatable manually operable handle which can be easily and reliably controlled by the photographer with minimal training and effort. According to especially preferred embodiments, there are no biasing means tending to bias the holder to a specific condition, when the photographer is not acting to intentionally move or control the holder, thus the holder remains in its set position when released by the photographer. This feature gives the photographer complete freedom to sequentially set the holder to a desired condition and then manipulate the film package with both hands being free for such manipulation and other tasks.

In accordance with certain preferred embodiments of the present invention, the holder top portion comprises an enclosure cover having at least one downwardly depending side wall including a camming slot, and the bottom portion comprises a film support surface plate having at least one pin extending beyond an edge thereof, which is slidable relative to the film support surface between first and second pin positions in the camming slot. The position change or holder control unit comprises the film support surface plate being nested in the enclosure cover with the slidable pin engaging the camming slot so that when the pin is moved to the first position in the camming slot, the enclosure cover and film support surface plate are moved relatively more distant from one another and when the pin is moved to the second position in the camming slot, the enclosure cover and film support surface plate are moved relatively closer to one another due to the action of the pin in the camming slot. This pin and camming slot connection provides for a reliable positive control of the position of the holder parts by means of a single rotary manual knob or lever. Since the holder parts are positively held by friction in the adjusted positions, biasing springs such as used in other holders discussed above are dispensed with.

Since the film package accommodating cavity dimensions are positively controlled and the holder parts defining same are maintained in respective adjusted set positions, the holders of the invention can readily adapt to film packages of slightly different thicknesses and can be manipulated to an open position which effectively frees the entire film package. Thus the withdrawal of the package can be accomplished in a simple matter while minimizing any snagging of the package parts on the holder during insertion or withdrawal. In especially preferred embodiments the holder parts are movable to an open position which opens the package accommodating slot to a size of between 102% to 125% of a nominal predetermined design maximal film package thickness. This assures an essentially totally free space for the film package to be withdrawn from the holder by pulling the same out of the holder slot in a direction parallel to the plane of the film package.

In especially preferred embodiments of the holder, only minimally short guide springs are needed for guiding the envelope anchoring, closure and retention protrusions past the slot opening during package withdrawal.

In certain preferred embodiments the film support surface plate is fixed to a bottom part of the holder such that the movement of the film support plate is accompanied by a corresponding change in the outside dimension of the holder. In other contemplated arrangements the outside dimensions of the holder are fixed and the film support surface plate is movably disposed in the holder and defines one side of the film package support cavity.

Other objects, advantages and novel features of the present invention will become apparent from the following detailed description of the invention when considered in conjunction with the accompanying drawings.

BRIEF DESCRIPTION OF THE DRAWINGS

FIG. 8 is a side planar view of the film support surface plate of the film holder of FIG. 1;

FIG. 9 is a top planar view of the film support surface plate of FIG. 8;

FIG. 10 is a bottom planar view of the film support surface plate having a slide frame attached thereto;

DETAILED DESCRIPTION OF THE DRAWINGS

Figure 1:
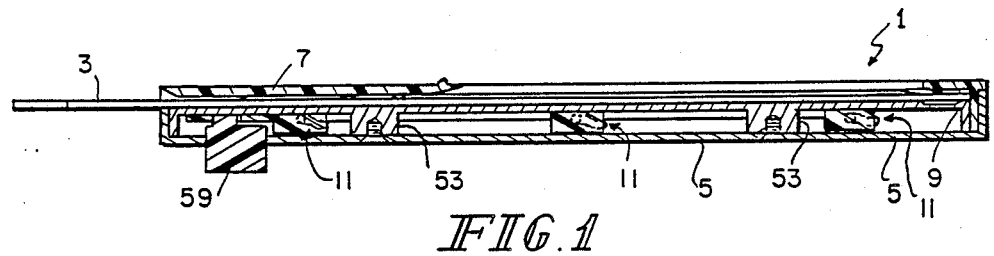
FIG. 1 is a side sectional view of a film holder constructed in accordance with a preferred embodiment of the present invention having a schematically depicted disposable film package inserted therein.
Figure 2:
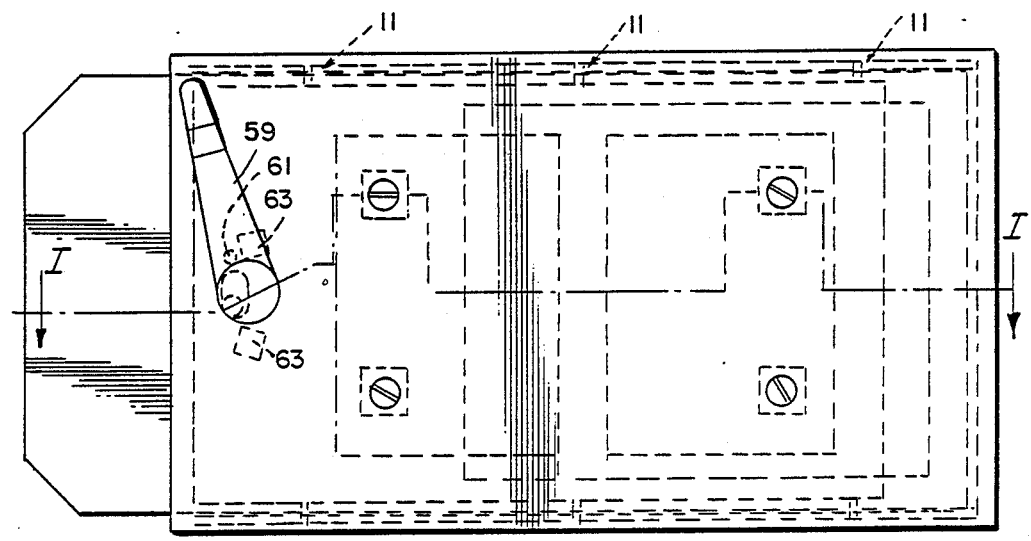
FIG. 2 is a top planar view of the film holder of FIG. 1.
Figure 3:
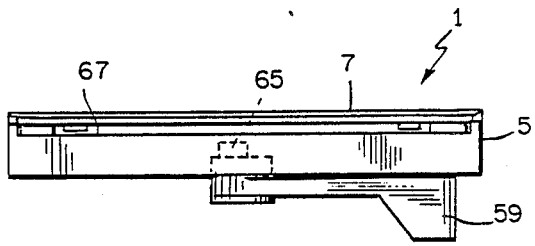
FIG. 3 is an end view of the film holder of FIG. 1.

As illustrated in FIGS. 1-17, the improved film holder, generally indicated by 1, for use with a disposable film package 3, is comprised generally of an enclosure base 5, an enclosure cover 7, a film support surface plate 9 and position change unit, generally indicated at 11, for moving the enclosure cover 7 and the film support surface 9 relative to one another between first and second positions as will be explained more fully hereinafter.

Figure 4:
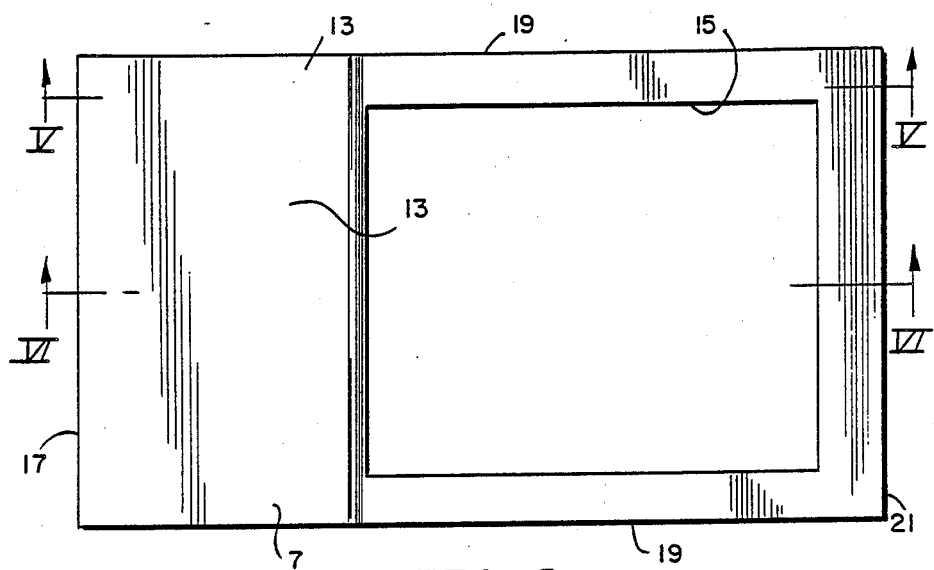
FIG. 4 is a top planar view of the enclosure cover, which forms a part of the film holder of FIG. 3.
Figure 5:
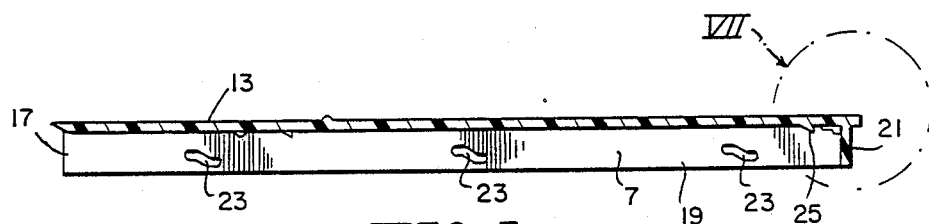
FIG. 5 is a longitudinal sectional view taken generally along line V—V of FIG. 4.
Figure 6:
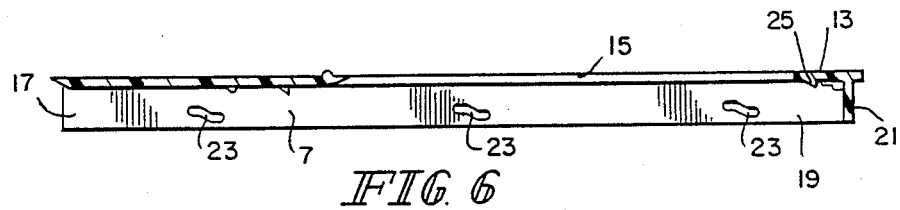
FIG. 6 is a longitudinal sectional view of the enclosure cover taken generally along line VI—VI of FIG. 4.
Figure 7:
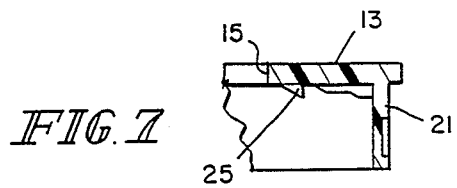
FIG. 7 is an enlarged detailed view of a circled portion VII of FIG. 5.

Referring to FIGS. 4-7, the enclosure cover 7 has a generally flat upper surface 13 with a light transmitting window 15 therethrough as best shown in FIG. 4. Side 17 of the enclosure cover is preferably open to facilitate the formation of a slot 65 to accept insertion of the disposable film package. Side walls 19 are provided as well as an end wall 21 which all depend downwardly from the upper surface 13. As best shown in FIGS. 4 and 5, each side wall 19 is provided with camming slots 23. Additionally, projecting downward from the interior of upper surface 13 is a tab 25 for engaging one end of a disposable film package such as disclosed by U.S. Pat. No. 4,725,865. As best shown in FIG. 7, the edge of the tab 25, which is nearest the open side 17 of the holder 1, is inclined at an acute angle with respect to upper surface 13, while the edge of the tab 25 furthest from the open side 17 is inclined at a substantially perpendicular angle to the upper surface 13.

The exterior transverse and longitudinal dimensions of the enclosure cover 7, as measured between the exterior surfaces of side walls 19 and end wall 21, are nominally smaller than the interior dimension of enclosure base 7, measured from the interior surfaces thereof so that the two may be nested together as best shown in FIGS. 1-3 and 14-17.

Referring to FIGS. 8 and 9, the film support surface plate 9 is depicted, and comprises a planar film supporting surface 27 having downwardly depending side walls 29 and end walls 31. Additionally, the planar film supporting surface 27 has a transverse end portion 33 depressed slightly from the plane of the film supporting surface which cooperates with tab 25 to retain film packages such as disclosed in U.S. Pat. No. 4,725,865. Additionally, a plurality of apertures 35 are provided in a spaced relationship along the longitudinal length of each of the side walls 29.

Figure 11:
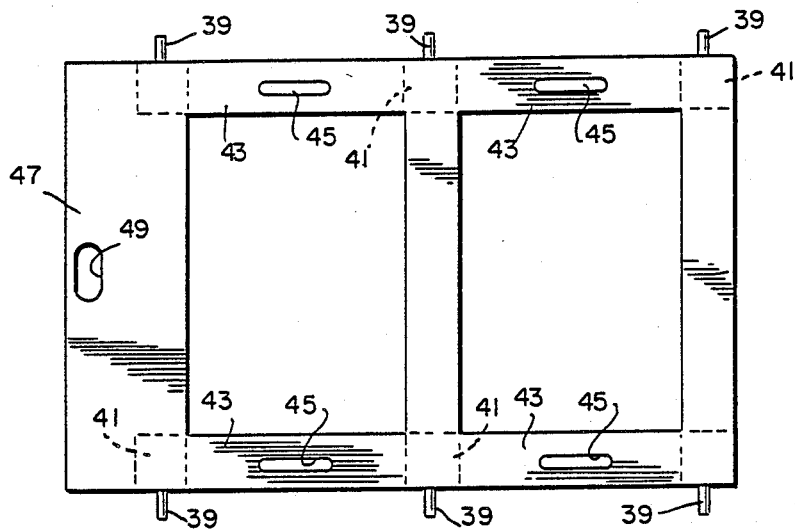
FIG. 11 is a top planar view of the slide frame of FIG. 10.

The position change unit means 11 includes a slide carrier 37 slideably affixed to the film support surface plate 9. Referring to FIG. 11, the slide carrier 37 comprises a plurality of pins 39, which extend beyond the longitudinal edge thereof. The pins 39 are preferably attached to the slide carrier 37 by attachment plates 41; however, these pins could be integrally formed with the slide carrier 37 in any suitable manner according to other contemplated preferred embodiments. Each longitudinal member 43 of the slide carrier 37 is provided with a plurality of guide slots 45 which form guide means for guiding the slide carrier 37 between first and second positions relative to the film support surface as will be described in further detail hereinafter. Additionally, transverse member 47 is provided with an additional slot 49 which will be more fully discussed below with respect to the operation of the position change unit 11.

Slide carrier 37, as best shown in FIG. 10, is attached to the bottom of the film support surface plate 9 so as to be slidable back and forth as indicated by arrow A. The slide carrier 37 is attached to the film support surface plate 9 by means of guides such as screws 51 or other suitable fasteners which cooperate with and engage slots 45 to guide and to limit the travel distance of the slide carrier 37 back and forth in the direction of arrow A. When the carrier 37 is affixed to the film support surface plate 9, pins 39 are positioned with respect to the guide slots 45 and the guides 51 so as to extend in an unrestricted manner through apertures 35. Supports 53 may be provided on the underside of the film support surface plate 9 having threaded apertures 55 which cooperate with screws or the like to firmly affix the film supporting surface plate 9 in a spaced relationship with the enclosure base 5.

Figure 12:
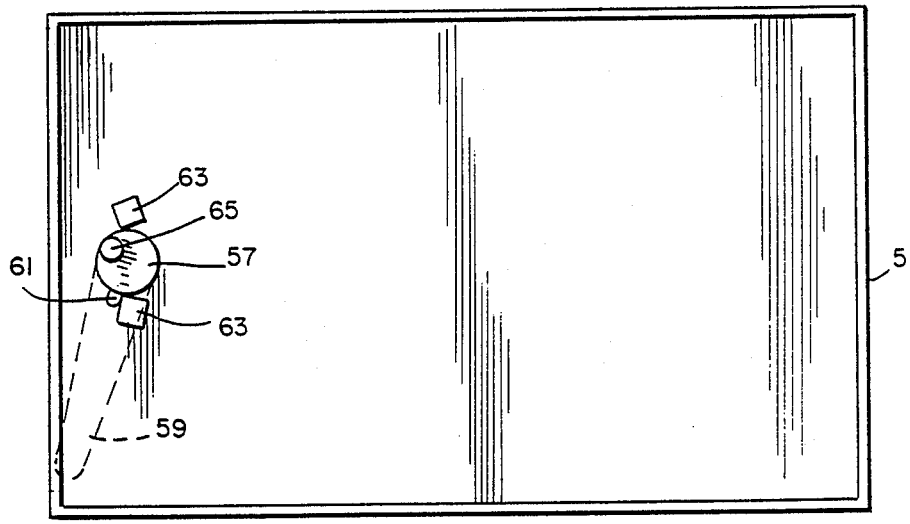
FIG. 12 is a top planar view of the enclosure base of the film holder of FIG. 1.
Figure 13:
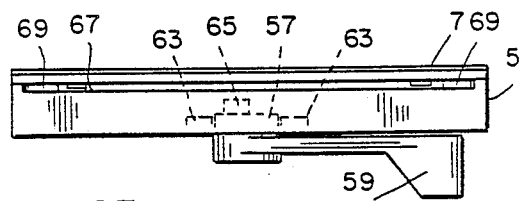
FIG. 13 is a side planar view of the enclosure base of FIG. 12.

Referring to FIG. 12, the enclosure base 5 is provided with a rotatable element 57 having a handle 59 for operation by the photographer. Additionally, the rotatable element 57 includes a stop 61 which cooperates with abutments 63 to limit the rotation of the rotational element 57. A slot engaging element 65 eccentrically mounted on rotational element 57 is provided to engage slot 49 of slide carrier 37 so that as the rotatable element 57 is moved between its rotational limits, the slot engagement member 65 in slot 49 moves the slide carrier 37 back and forth in the direction of arrow A between first and second positions, as best shown in FIGS. 14-17. As best shown in FIG. 13, a side wall of the enclosure base 5 is provided with a recess 67 forming a slot with the facing enclosure cover 7 to permit the insertion and removal of the disposable film package. In especially preferred embodiments this slot is dimensioned so that when the position change unit 11 is in a position of maximum opening, the slot has a width between 102% and 125% of a nominal predetermined design maximum film package thickness, including these film package retention and anchoring tabs or the like.

Figure 14:
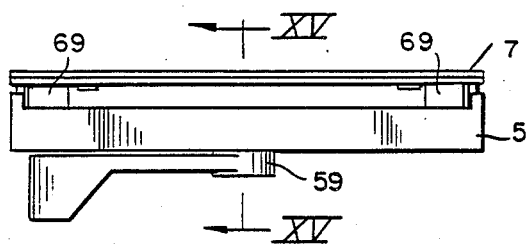
FIG. 14 is an end view of the film holder of FIG. 1 showing the enclosure cover and the film support surface in their open or retracted position.
Figure 15:
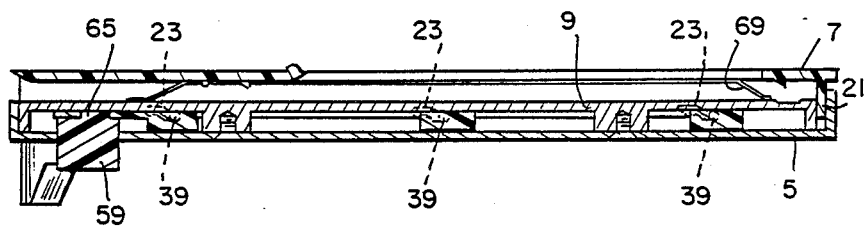
FIG. 15 is a longitudinal sectional view taken generally along line XV—XV of FIG. 14 showing the enclosure cover and film support surface in their open or retracted position.

The operation of the position change unit 11 is best illustrated with reference to FIGS. 14-17. Referring to FIGS. 14 and 15, the film holder 1 is shown in the open position for insertion of a disposable film package and includes wave springs 69 for resiliently engaging lateral edges of the film package. In operation, the handle 59 is rotated to the position shown in FIG. 14 so that the eccentrically mounted slot engaging element 65 moves the slide carrier 37 toward side wall 21 of the enclosure cover 7. As a result of this sliding motion, pins 39 move in the camming slots 23 to the position shown in FIG. 15. Since the slide carrier 37 is attached to the bottom of the film support surface plate 9 which is in turn affixed to the enclosure cover 7 by means of pins 39 engaging camming slots 23, the movement of pins 39 in camming slots 23 results in a relative movement between the enclosure cover 7 and the film support surface plate 9 such that they are spaced from one another a distance sufficient to permit the insertion of the film package.

Figure 16:
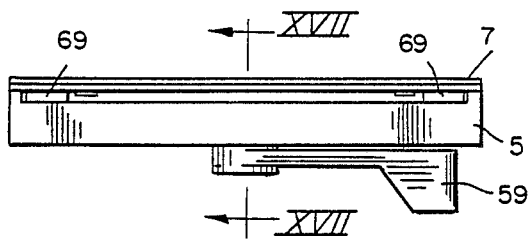
FIG. 16 is an end view of the film holder of FIG. 1 showing the enclosure cover and film support surface in their closed, camera set position.
Figure 17:
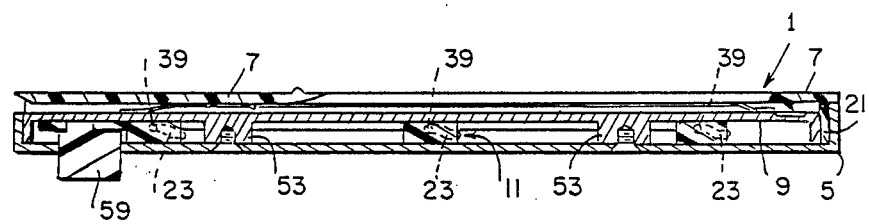
FIG. 17 is a longitudinal sectional view taken generally along line XVII—XVII of FIG. 16 showing the enclosure cover and film support surface in their closed, camera set position.

FIG. 16 illustrates the film holder 1 in a closed or camera set position due to rotation of the handle 59. When handle 59 is moved to the position as shown, the slide carrier 37 is moved towards recess 67 so that the pins 39 assume a position in camming slots 23 as shown in FIG. 17. As a result, the enclosure cover 7 is drawn closer to the film support surface plate 9 so as to assume a closed position which does not permit removal of the film package through the slot formed between recess 67 and the enclosure cover 7.

It will be understood that the area adjacent the recess 67 of the cover 7 will be covered with a light-tight plush "strip". Since the holder parts are movable in a positive manner to free the envelope in the cavity, only minimally long guide springs need be provided adjacent the plush strip to guide the envelope past the envelope retention ridge at the slot when the holder is maximally open.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A photographic film holder for use with a removable photographic film package, comprising:
   an enclosure cover, said enclosure cover exhibiting a continuously open clear window opening which faces toward a camera lens when in an operative in-use position in a camera;
   a film support surface plate positioned in a spaced relationship to the enclosure cover, whereby a film package receiving cavity is defined between the enclosure cover and the film support surface plate, the film support surface plate and the enclosure cover being movable transversely relative to one another between a first position permitting withdrawal of a film package from the holder and a second position preventing withdrawal of a film package from the holder; and
   holder control means for moving the film support surface plate and the enclosure cover relative to one another between the first position and the second position, said holder control means including handle means movable between a first handle position maintaining the film support surface plate in said first position and a second handle position maintaining the film support surface plate in said second position, whereby said enclosure cover and said film support surface plate are maintained in their respective set positions in dependence on the position of the handle means.

2. A holder constructed according to claim 1, wherein:
the enclosure cover includes at least one downwardly depending side wall having camming slot means;
wherein the film support surface plate has pin means extending beyond an edge of the film support surface plate which is slidable relative to the film support surface plate between first and second pin positions in the camming slot means of the enclosure cover; and
wherein the holder control means comprises means for guiding the film support surface plate in the enclosure cover with the slidable pin engaging the camming slot means so that when the pin means is moved to the first position in the camming slot means, the enclosure cover and film support surface plate are moved relatively more distant from one another and when the pin means is moved to the second position in the camming slot means the enclosure cover and film support surface plate are moved relatively closer to one another due to the action of the pin means in the camming slot means.

3. A holder constructed according to claim 2, further comprising pin positioning means for positioning the pin means between the first and second positions.

4. A holder constructed according to claim 3, wherein the pin positioning means comprises:
slide carrier means for carrying the pin means;
guide means for guiding the slide carrier means between the first and second pin positions relative to the film support surface plate; and
guide engaging means for affixing the slide carrier means to the film support surface plate; and
and wherein the manually operable handle means are operatively connected for moving the slide carrier means between the first and second pin positions.

5. A holder constructed according to claim 4, further comprising an enclosure base into which the enclosure cover and film support surface plate are nested.

6. A holder according to claim 5, wherein said holder control means comprises:
a rotatable member connected to the handle means and being movable in the enclosure base between first and second rotational positions about a rotational axis;
a slide carrier engaging means eccentrically mounted with respect to the rotational axis of the rotational member for engaging a slot positioned transversely to the direction of travel of the slide carrier;
whereby rotation of the rotatable member between the first and second rotational positions moves the eccentrically mounted slide carrier engaging means at least back and forth in the direction of travel (A) of the slide carrier so that when the slide carrier engaging means engages the slot extending transversely to the direction of slide carrier travel (A), the slide carrier is moved between the first and second pin positions.

7. A holder constructed according to claim 6, wherein the rotatable member is provided with the handle exterior of the enclosure base for rotating the rotatable member.

8. A holder constructed according to claim 1, wherein the handle means is rotatably mounted at an exterior part of the holder which protrudes outside a camera back when the holder is in an operative in use position in a camera.

9. A holder constructed according to claim 1, wherein said holder control means includes cam means frictionally engageable in cam slot guide means.

10. A holder constructed according to claim 1, wherein end stop means are provided for controlling positioning of the handle means at respective end positions corresponding to said first and second positions.

11. A holder constructed according to claim 1, wherein said enclosure cover and film support surface plate define a film package insertion slot at one end of said cavity, and wherein said holder control means is operative when said enclosure cover and film support surface plate are in said first position to enlarge said insertion slot to a width corresponding to between 102% and 125% of the nominal predetermined maximum package thickness, whereby the film package can be easily removed from and inserted into the holder.

12. A photographic film holder for use with a removable photographic film package, comprising:
an enclosure cover, said enclosure cover exhibiting a continuously open clear window opening which faces toward a camera lens when in an operative in-use position in a camera;
a film support surface plate positioned in a spaced relationship to the enclosure cover, whereby a film package receiving cavity is defined between the enclosure cover and the film support surface plate, the film support surface plate and the enclosure cover being movable transversely relative to one another between a first position permitting withdrawal of a film package from the holder and a second position preventing withdrawal of a film package from the holder; and
holder control means for moving the film support surface plate and the enclosure cover relative to one another between the first position and the second position, wherein said enclosure cover and film support surface plate define a film package insertion slot at one end of said cavity, and wherein said holder control means is operative when said enclosure cover and film support surface plate are in said first position to enlarge said insertion slot to a width corresponding to between 102% and 125% of the nominal predetermined maximum package thickness, whereby the film package can be easily removed form and inserted into the holder.

13. A photographic film holder according to claim 1, wherein said handle means is a manually operable handle means.

14. A photographic film holder according to claim 12, wherein said handle means is a manually operable handle means.

15. A photographic film holder for use with a removable photographic film package, comprising:
an enclosure cover;
a film support surface plate positioned in a spaced relationship to the enclosure cover, whereby a film package receiving cavity is defined between the enclosure cover and the film support surface plate, the film support surface plate and the enclosure cover being movable transversely relative to one another between a first position permitting withdrawal of a film package from the holder and a second position preventing withdrawal of a film package from the holder; and holder control means for moving the film support surface plate and the enclosure cover relative to one another between the first position and the second position, said holder control means including handle means movable between a first handle position maintaining the film support surface plate in said first position and a second handle position maintaining the film support surface plate in said second position, whereby said enclosure cover and said film support surface plate are maintained in their respective set position in dependence on the position of the handle means, wherein the enclosure cover includes at one downwardly depending side wall having first camming means;

wherein the film support surface plate has second camming means engageable with the first camming means during relative movement of said enclosure cover and film support surface plate.

16. A holder constructed according to claim 14, wherein the enclosure cover and film support surface plate are nested together during movement between the respective first and second position.

17. A holder constructed according to claim 16, wherein the holder control means comprises means operably connecting the handle means to forceably move one of said first and second camming means.

18. A holder constructed according to claim 17, wherein said first camming means includes camming slot means formed in the at least one downwardly depending side wall of the enclosure cover, and when said second camming means includes at least one pin means extending beyond an edge of the film support surface plate engageable in the camming slot means.

19. A holder constructed according to claim 18, further comprising pin positioning means for positioning the pin means between the first and second positions.

20. A holder constructed according to claim 19, wherein the pin positioning means comprises:

slide carrier means for carrying the pin means;

guide means for guiding the slide carrier means between the first and second pin positions relative to the film support surface plate;

guide engaging means for affixing the slide carrier means to the film support surface plate; and wherein the handle means are operatively connected for moving the slide carrier means between the first and second pin positions.

21. A holder constructed according to claim 20, further comprising an enclosure base into which the enclosure cover and film support surface plate are nested.

22. A holder constructed according to claim 21, wherein said holder control means comprises:

a rotatable member connected to the handle means and being movable in the enclosure base between first and second rotational positions about a rotational axis;

a slide carrier engaging means eccentrically mounted with respect to the rotational axis of the rotational member for engaging a slot positioned transversely to the direction of travel of the slide carrier;

whereby rotation of the rotatable member between the first and second rotational positions moves the eccentrically mounted slide carrier engaging means at least back and forth in the direction of travel (A) of the slide carrier so that when the slide carrier engaging means engages the slot extending transversely to the direction of slide carrier travel (A), the slide carrier is moved between the first and second pin positions.

23. A holder constructed according to claim 22, wherein the rotatable member is provided with the handle exterior of the enclosure base for rotating the rotatable member.

24. A holder constructed according to claim 15, wherein said handle means is a manually operable handle means.

* * * * *